United States Patent
Xie et al.

(10) Patent No.: US 12,128,512 B2
(45) Date of Patent: Oct. 29, 2024

(54) ASSEMBLY METHOD FOR DEEP IN-SITU HIGH-FIDELITY CORING CALIBRATION PLATFORM

(71) Applicant: SICHUAN UNIVERSITY, Chengdu (CN)

(72) Inventors: Heping Xie, Chengdu (CN); Ru Zhang, Chengdu (CN); Zetian Zhang, Chengdu (CN); Ling Chen, Chengdu (CN); Mingzhong Gao, Chengdu (CN); Zhilong Zhang, Chengdu (CN); Yang Yang, Chengdu (CN); Jianan Li, Chengdu (CN); Wei Huang, Chengdu (CN); Li Ren, Chengdu (CN); Yihang Li, Chengdu (CN); Kun Xiao, Chengdu (CN); Weiqiang Ling, Chengdu (CN); Chendi Lou, Chengdu (CN); Heng Gao, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 0 days.

(21) Appl. No.: 18/031,357

(22) PCT Filed: Sep. 23, 2022

(86) PCT No.: PCT/CN2022/120757
§ 371 (c)(1),
(2) Date: Apr. 12, 2023

(87) PCT Pub. No.: WO2023/142501
PCT Pub. Date: Aug. 3, 2023

(65) Prior Publication Data
US 2024/0261911 A1    Aug. 8, 2024

(30) Foreign Application Priority Data
Jan. 26, 2022    (CN) .......................... 202210092639.1

(51) Int. Cl.
*B23P 19/04*    (2006.01)
*B23P 19/10*    (2006.01)
(Continued)

(52) U.S. Cl.
CPC ............... *B23P 19/04* (2013.01); *B23P 19/10* (2013.01); *E21B 41/00* (2013.01);
(Continued)

(58) Field of Classification Search
CPC ........... B23P 19/04; B23P 19/10; B23P 19/12; G01M 99/00; G01M 99/008;
(Continued)

(56) References Cited

FOREIGN PATENT DOCUMENTS

| CN | 201889605 U | * | 7/2011 |
|---|---|---|---|
| CN | 102913162 A | | 2/2013 |

(Continued)

*Primary Examiner* — Matthew P Travers
(74) *Attorney, Agent, or Firm* — Bayramoglu Law Offices LLC

(57) ABSTRACT

An assembly method for a deep in-situ high-fidelity coring calibration platform includes the following steps: S1: fixing a core bin assembly subsystem on a preset ground foundation and fixing a simulator of a core bin on a mounting base plate of the core bin assembly subsystem; S2: driving a cylinder and driving the mounting base plate to move to a preset position; S3: driving a servo motor and controlling two clips to move close to each other; S4: fixing a drill pipe bin assembly subsystem on the ground foundation; S5: assembling multiple sections of a drill pipe bin in turn; aligning and connecting a bottom of the drill pipe bin to the simulator, and aligning and communicating the top of the drill pipe bin with the lower part of an adaptive drill pipe guide structure; and S6: driving the adaptive drill pipe guide structure to perform accurate positioning.

10 Claims, 15 Drawing Sheets

(51) Int. Cl.
*E21B 41/00* (2006.01)
*G01M 99/00* (2011.01)
*E21B 25/00* (2006.01)

(52) U.S. Cl.
CPC .......... *G01M 99/008* (2013.01); *E21B 25/00* (2013.01); *Y10T 29/49895* (2015.01)

(58) Field of Classification Search
CPC ......... Y10T 29/49758; Y10T 29/49895; Y10T 29/49902; Y10T 29/53978; E21B 25/00; E21B 41/00; E21B 2200/00
See application file for complete search history.

(56) References Cited

FOREIGN PATENT DOCUMENTS

| | | | |
|---|---|---|---|
| CN | 203214043 U | * | 9/2013 |
| CN | 113803009 A | | 12/2021 |
| CN | 114458205 A | | 5/2022 |
| JP | 2003064976 A | | 3/2003 |
| KR | 20150095381 A | * | 8/2015 |

* cited by examiner

ASSEMBLY METHOD FOR DEEP IN-SITU HIGH-FIDELITY CORING CALIBRATION PLATFORM

CROSS REFERENCE TO THE RELATED APPLICATIONS

This application is the national phase entry of International Application No. PCT/CN2022/120757, filed on Sep. 23, 2022, which is based upon and claims priority to Chinese Patent Application No. 202210092639.1, filed on Jan. 26, 2022, the entire contents of which are incorporated herein by reference.

TECHNICAL FIELD

The present disclosure belongs to the technical field of energy resource drilling and, in particular, relates to an assembly method for a deep in-situ high-fidelity coring calibration platform.

BACKGROUND

In European and American countries, energy resources are generally buried at a depth of less than 2,000 m. In contrast, in China, more than 70% of the energy resources are buried at a depth of more than 2,000 m. In China, the shallow energy resources have been exhausted, and the energy resources go deeper at a rate of more than 10 m every year. The country has increased its exploitation depth of oil and gas resources to 8,418 m, and its dependence on foreign oil import has reached 67%, far exceeding the internationally recognized energy security warning level. In this context, to explore energy resources in depth has become the most urgent practical issue in China at present, and has become a major strategic scientific and technological issue and major energy security issue in China.

To march into the deep earth, it is necessary to carry out research step by step from three aspects, namely, deep drilling, deep basic scientific laws, and deep resource development and utilization, among which the most critical is the research of deep basic scientific laws. The deep in-situ environment is very complex. Therefore, before the deep in-situ coring system is applied to on-site scientific drilling, it is necessary to carry out laboratory simulation to effectively verify the feasibility of the equipment and calibrate relevant parameters. This requires building a complete experimental simulation platform. However, the existing assembly platform has a complex structure, low automation, and a cumbersome assembly process so the technical methods for the existing assembly platform are problematic. Given this, it is necessary to establish a practical assembly method for a deep in-situ high-fidelity coring calibration platform.

SUMMARY

To overcome the shortcomings of the prior art, the present disclosure provides an assembly method for a deep in-situ high-fidelity coring calibration platform. In the prior art, the existing assembly platform has a complex structure, low automation, and a cumbersome assembly process so the technical methods for the existing assembly platform are problematic.

To achieve the above objective, the present disclosure adopts the following technical solution:

An assembly method for a deep in-situ high-fidelity coring calibration platform includes the following steps:

S1: fixing a core bin assembly subsystem on a preset ground foundation and fixing a simulator of a core bin on a mounting base plate of the core bin assembly subsystem;

S2: driving a cylinder, such that a piston end of the cylinder drives the mounting base plate to move on a Y-axis until a preset position;

S3: driving a servo motor and controlling, by two manipulators, two clips to move close to each other along the simulator of the core bin to support and fix the simulator;

S4: fixing a drill pipe bin assembly subsystem provided on an X-axis perpendicular to the Y-axis on the ground foundation;

S5: assembling multiple sections of a drill pipe bin in turn based on the length of a drill pipe; aligning and connecting, after the assembly, the bottom of the complete drill pipe bin to the simulator of the core bin, and aligning and communicating the top of the complete drill pipe bin with the lower part of an adaptive drill pipe guide structure; and S6: driving the adaptive drill pipe guide structure to perform accurate positioning for the assembly of the drill pipe bin in the X-axis and perform adaptive guidance for assembly of the drill pipe.

In the present disclosure, the assembly method for a deep in-situ high-fidelity coring calibration platform has the following benefits.

The present disclosure is based on the core bin assembly subsystem to realize the bearing of the whole simulator and adjust the simulator of the core bin to the preset position on the Y-axis. The two manipulators of the core bin assembly subsystem further accurately control the position of the simulator of the core bin on the Y-axis.

The present disclosure is based on the drill pipe bin assembly subsystem to regulate the position of the drill pipe on the Z-axis through the mounting bracket, and the movable bracket that is on the mounting bracket and movable in the vertical direction.

The present disclosure provides the adaptive drill pipe guide structure on the movable bracket to adjust and control the drill pipe on the X-axis and accurately position the drill pipe bin during the assembly process, ensuring the assembly accuracy of the drill pipe and the drill pipe bin and providing stable support and fixation for the drill pipe. In addition, during the assembly of the drill pipe, the deep in-situ high-fidelity coring calibration platform guides the drill pipe to ensure that the drill pipe is accurately aligned with the core bin below the mounting platform.

The present disclosure can realize the accurate assembly and reliable fixation of the components of a large-scale non-standard high-temperature and high-pressure experimental simulator and the assembly of each section of the simulator through the orthogonal triaxial position adjustment. In addition, the present disclosure improves the automation degree of the assembly system through the adaptive drill pipe guide structure.

Figure 1:
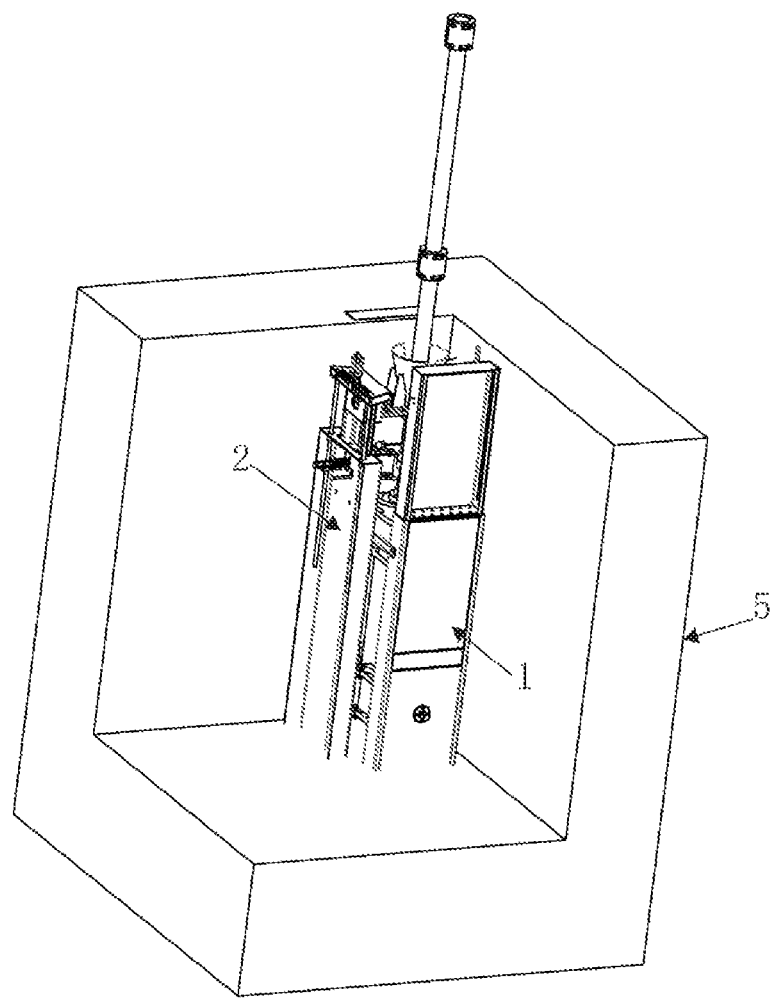
FIG. 1 is a structural diagram of an assembly system and a ground foundation according to the present disclosure.

Reference Numerals: 1. core bin assembly subsystem;
101. slide rail; 102. mounting base plate; 103. roller; 104. cylinder mounting plate; 105. cylinder; 106. mounting lug; 107. mounting seat assembly; 108. hinge shaft; 109. fixing plate; 110. first connecting plate; 111. stop strip; 112. mounting post; 113. closure plate; 114. transverse reinforcing plate; 115. vertical reinforcing plate; 116. pull rod; 117. manipulator; and 118. simulator;
119. servo motor; 120. dynamic guide rod; 121. clip; 122. anti-rotation rod; 123. screw rod; 124. second connecting plate; 125. static guide rod; 126. mounting bracket; 127. movable support element; 128. spring; 129. motor mounting plate; 130. strip hole; 131. movable lug; and 132. stud;
2. drill pipe bin assembly subsystem;
201. fixed bracket; 202. movable bracket; 203. drive device; 204. transmission box; 205. transmission screw rod; 206. screw nut; 207. first guide rod; 208. linear bearing; 209. driving shaft; 210. driven shaft; 211. notch; 212. nut mounting plate; 213. bearing mounting plate; 214. nut sleeve; 215. connection portion; 216. mounting hole; 217. third connecting plate; 218. triangular reinforcing plate; 219. rectangular reinforcing plate; and 220. stop element;
221. guide rail mounting plate; 222. through hole; 223. guide element; 224. upper part; 225. lower part; 226. fourth connecting plate; 227. reinforcing plate; 228. guide sleeve; 229. rotating motor; 230. guide screw rod; 231. connection seat; 232. guide rod seat; 233. second guide rod; 234. guide rod motor seat; 235. linear guide rail; and 236. slider;

301. rolling shaft; 302. drill pipe; 303. sliding mounting plate; 304. sliding mounting bracket; 305. first hinge seat; 306. second slide rail; 307. lower guide-rod fixing plate; 308. motor seat; 309. nut mounting plate; 310. motor; 311. rotating shaft; 312. upper guide-rod fixing plate; 313. stabilizing guide rod; 314. mounting platform; 315. sliding guide screw rod; 316. second hinge seat; 317. first connecting element; 318. first slider; and 319. first slide rail;

401. motor mounting seat; 402. servo motor; 403. coupling; 404. guide rod; 405. guide screw rod; 406. nut; 407. guide seat; 408. fixing plate; 409. rubber cushion; 410. mounting plate; 411. first roller; 412. mounting frame; 413. vertical plate; 414. third slide rail; 415. mounting base; 416. slider; 417. graphite-bronze sleeve; and 418. connecting plate; and 5. ground foundation.

DETAILED DESCRIPTION OF THE EMBODIMENTS

The specific implementations of the present disclosure are described below to facilitate those skilled in the art to understand the present disclosure, but it should be clear that the present disclosure is not limited to the scope of the specific implementations. Various obvious changes made by those of ordinary skill in the art within the spirit and scope of the present disclosure defined by the appended claims should fall within the protection scope of the present disclosure.

In an embodiment of the present disclosure, an assembly method for a deep in-situ high-fidelity coring calibration platform specifically includes the following steps:

S1. Core bin assembly subsystem 1 is fixed on a preset ground foundation, and a simulator of a core bin is fixed on a mounting base plate of the core bin assembly subsystem.

S2. Cylinder 105 is driven, and a piston end of the cylinder drives the mounting base plate 102 to move on a Y-axis until the mounting base plate reaches a preset position.

S3. Servo motor 119 is driven to allow two manipulators to control two clips 121 to move in opposite directions along the simulator 118 of the core bin to support and fix the simulator 118.

S4. Drill pipe bin assembly subsystem 2 provided on an X-axis perpendicular to the Y-axis is fixed on the ground foundation.

S5. Multiple sections of the drill pipe bin are assembled in turn based on the length of the drill pipe. After the assembly, the bottom of the complete drill pipe bin is aligned and connected to the top of the simulator 118 of the core bin, and the top of the complete drill pipe bin is aligned and communicated with a lower part of an adaptive drill pipe guide structure.

S6. The adaptive drill pipe guide structure is driven to perform accurate positioning for the assembly of the drill pipe bin in the X-axis and perform adaptive guidance for the assembly of the drill pipe.

Figure 2:
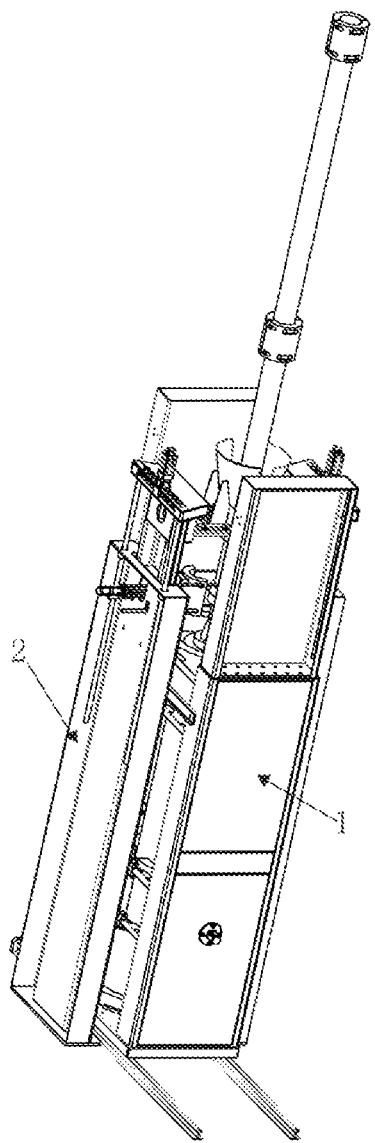
FIG. 2 is a structural diagram of a deep in-situ high-fidelity coring calibration platform in the assembly system according to the present disclosure.
Figure 3:
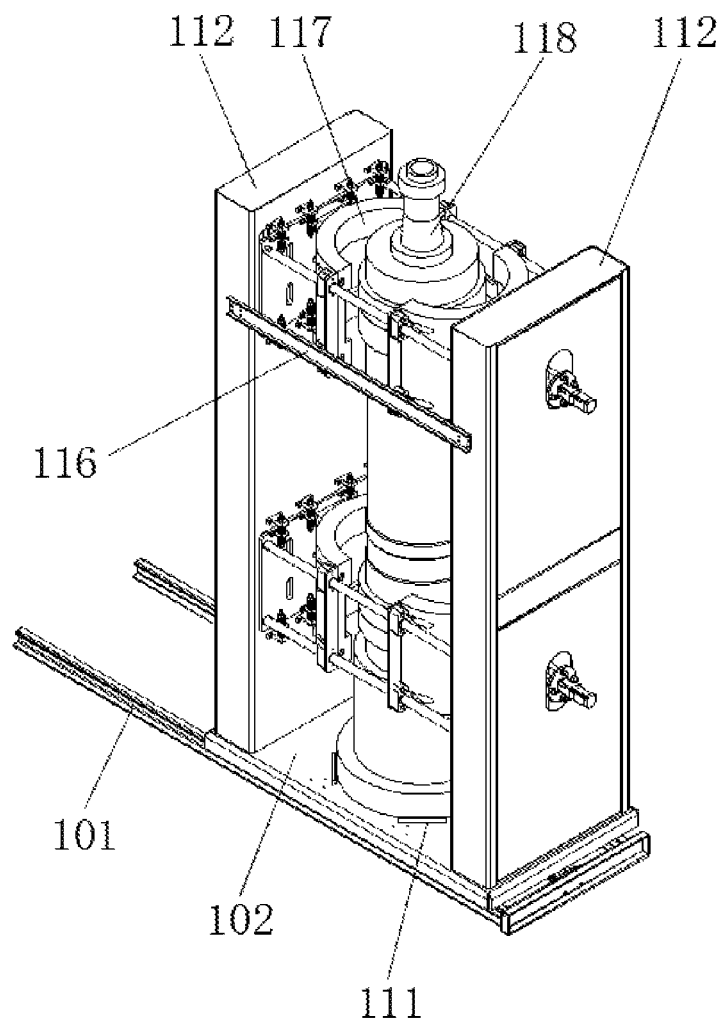
FIG. 3 is a structural diagram of a core bin assembly subsystem.
Figure 4:
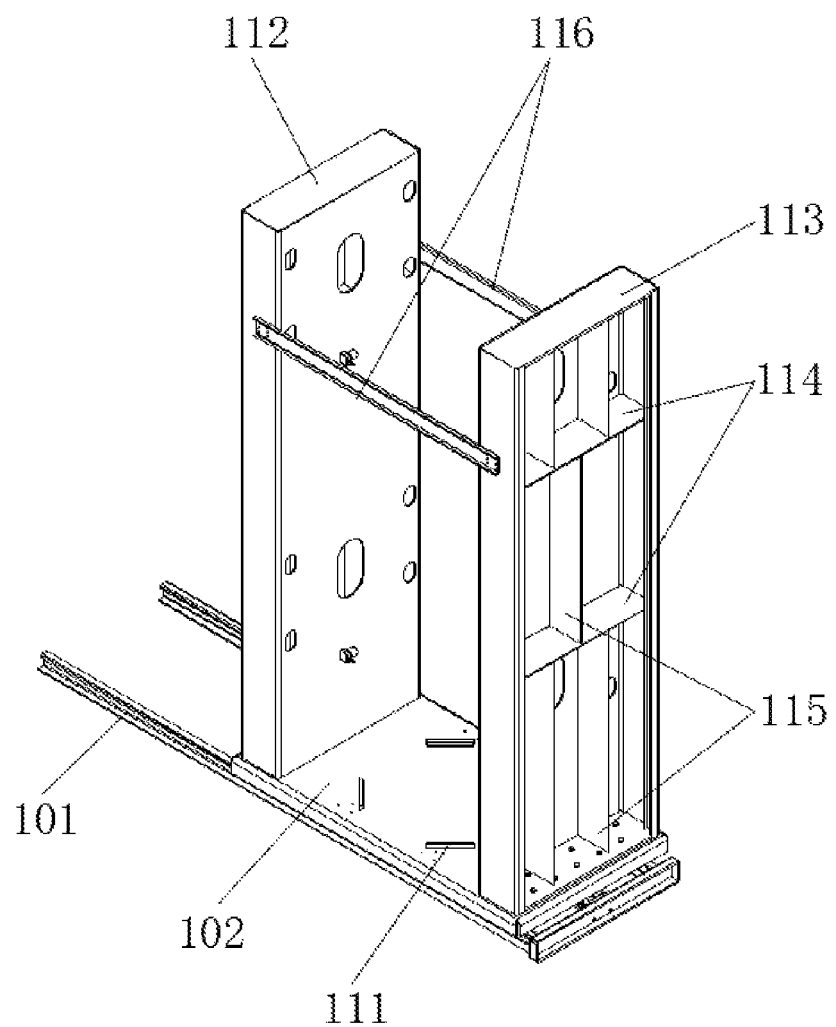
FIG. 4 is a partial structural diagram of the core bin assembly subsystem.
Figure 5:
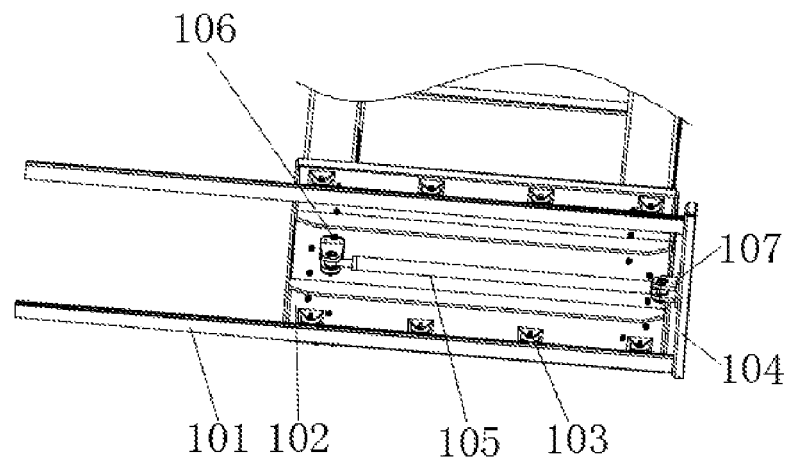
FIG. 5 is a bottom view of the core bin assembly subsystem.
Figure 6:
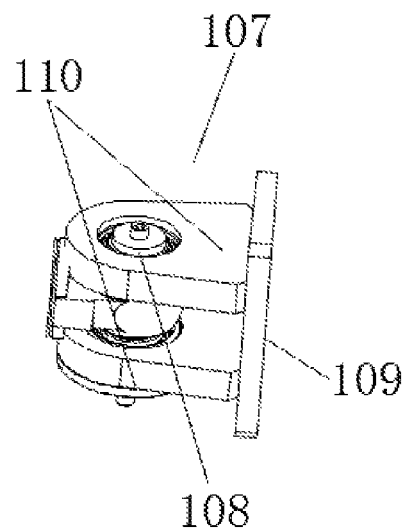
FIG. 6 is a structural diagram of a mounting seat assembly.
Figure 7:
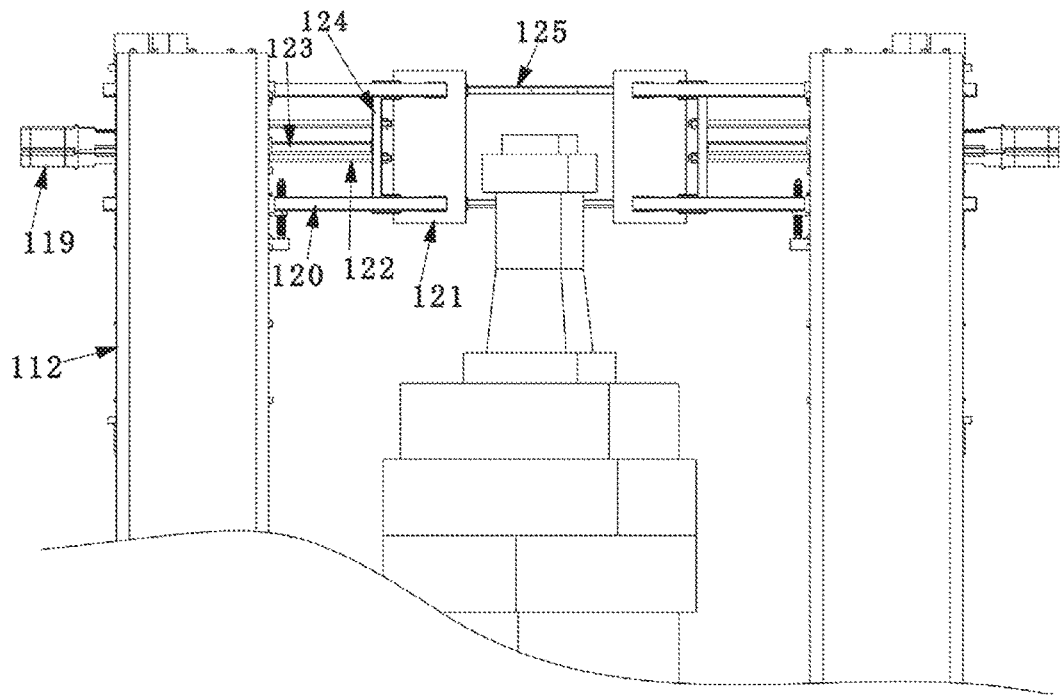
FIG. 7 is a diagram for mounting a manipulator.
Figure 8:
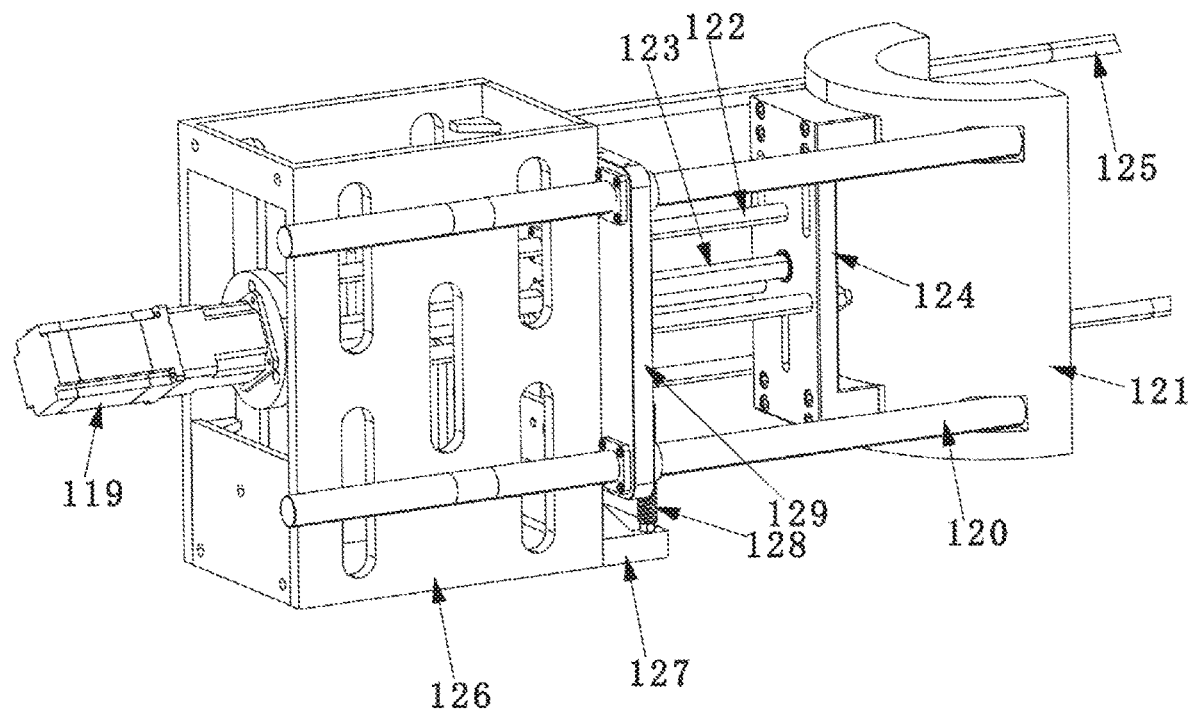
FIG. 8 is a back view of a clip of the manipulator.
Figure 9:
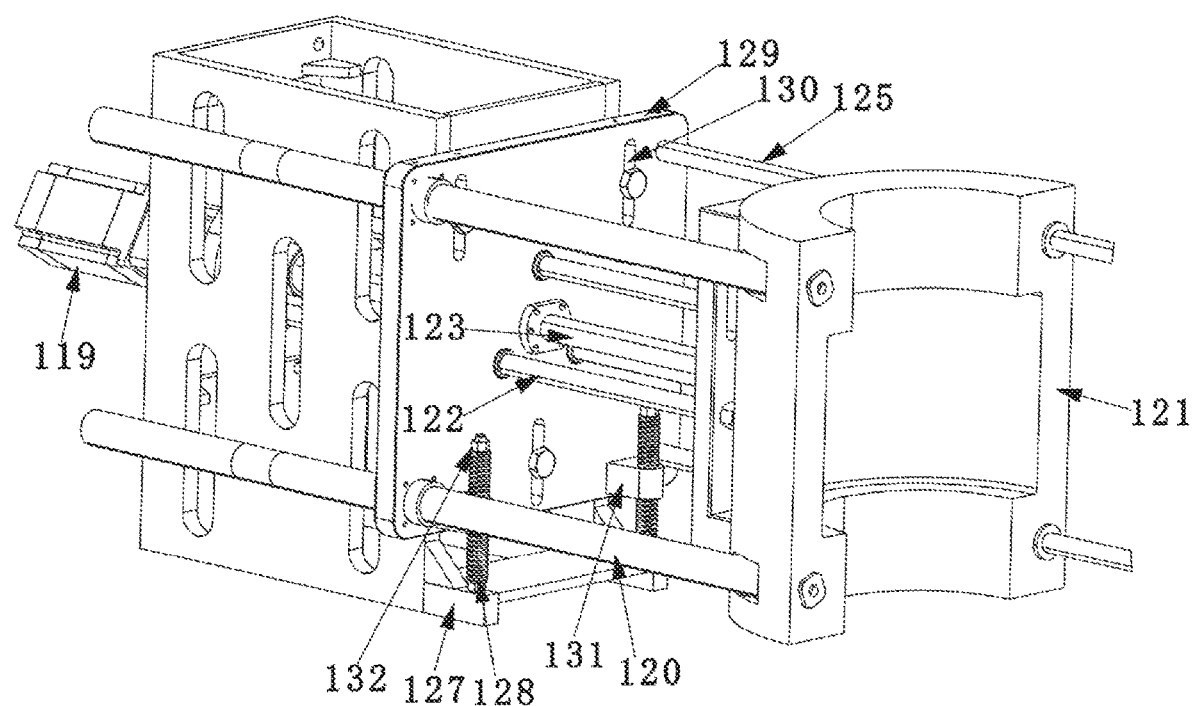
FIG. 9 is a front view of a clip of the manipulator.
Figure 10:
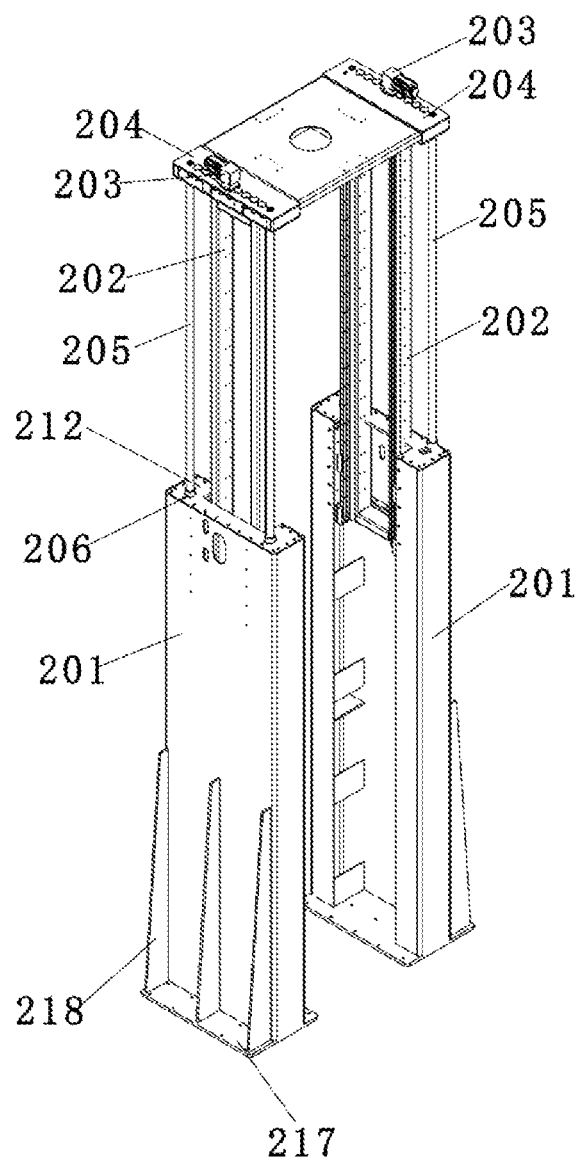
FIG. 10 is a structural diagram of a mounting bracket.
Figure 11:
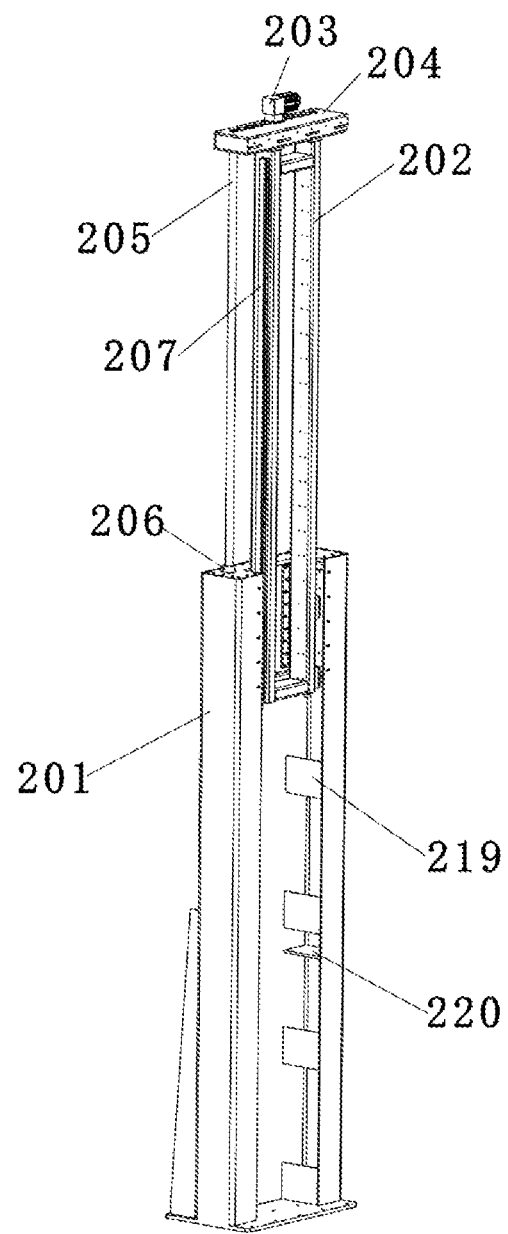
FIG. 11 is a structural diagram of a single side of the mounting bracket.
Figure 12:
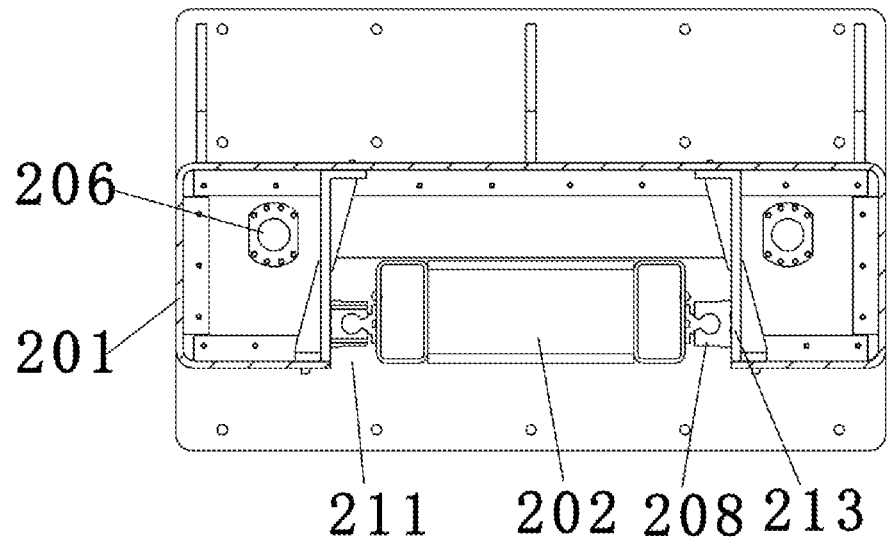
FIG. 12 is a structural diagram of a movable bracket connected inside the fixed bracket.
Figure 13:
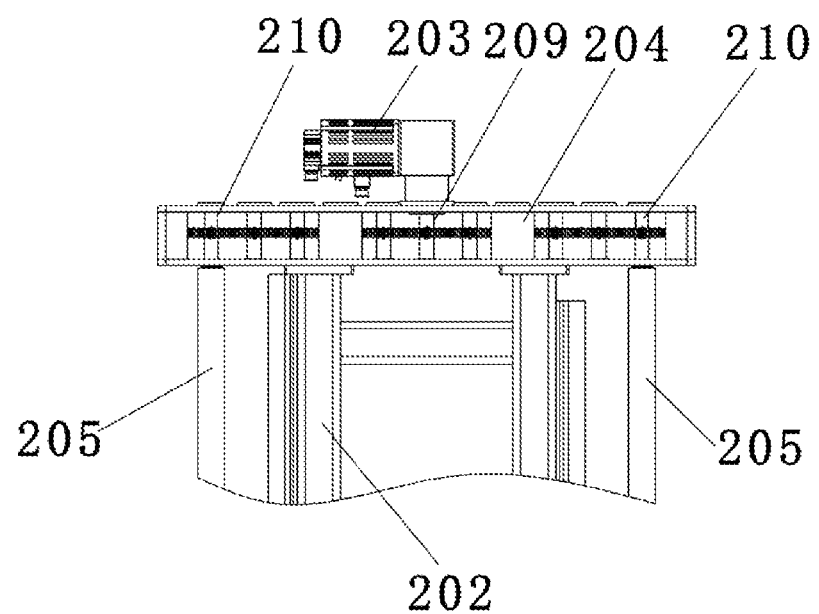
FIG. 13 is a structural diagram of a drive device and a transmission box arranged on top of the movable bracket.
Figure 14:
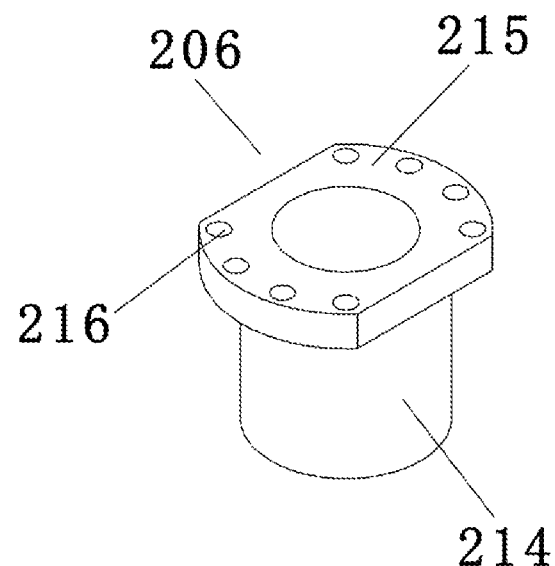
FIG. 14 is a structural diagram of a screw nut.

According to an embodiment of the present disclosure, referring to FIGS. 1 to 2, in this solution, the structure involved in the assembly method for the deep in-situ high-fidelity coring calibration platform specifically includes the core bin assembly subsystem 1 and the drill pipe bin assembly subsystem 2. The core bin assembly subsystem is fixed on the ground foundation 5 to bear the whole simulator of the core bin and control the accurate movement of the simulator of the core bin.

The drill pipe bin assembly subsystem 2 is located above the core bin assembly subsystem to perform accurate positioning for the drill pipe assembly process to improve the assembly accuracy of the drill pipe and provide stable support and fixation for the drill pipe.

Specifically, the core bin assembly subsystem and drill pipe bin assembly subsystem are described in detail as follows.

Referring to FIGS. 5 to 9, steps S1 to S3 are described as follows.

The core bin assembly subsystem includes two slide rails 101 opposite and flush provided on the ground foundation 5. The mounting base plate 102 for bearing the simulator 118 is provided on the two slide rails 101. Two sides of the mounting base plate 102 are provided with multiple rollers 103 for rolling on the two slide rails 101. The rollers 103 each are fixedly connected to a lower end surface of the mounting base plate 102 through a roller seat. Cylinder mounting plate 104 is provided on the ground foundation 5. The cylinder mounting plate 104 is provided on one side of the mounting base plate 102. The cylinder 105 with a same length direction as the slide rails 101 is provided on the cylinder mounting plate 104. The lower end surface of the mounting base plate 102 is provided with mounting lug 106 connected to the piston end of the cylinder 105.

In a specific implementation of the two slide rails 101 and the rollers 103, the two slide rails 101 are I-beams. A circumferential outer wall of each of the rollers 103 is provided with an annular groove mated with flanges of the I-beam. The I-beam is widely used because it has stable bearing performance and is low cost.

The fixation means between the piston end of the cylinder 105 and the lower end surface of the mounting plate is limited to hinged connection for easy assembly and disassembly. Mounting seat assembly 107 hinged to a seat of the cylinder 105 is provided in the center of the cylinder mounting plate 104. The mounting seat assembly 107 includes hinge shaft 108, fixing plate 109, and two first connecting plates 110. The two first connecting plates 110 are vertically connected to the fixing plate 109, and the two first connecting plates 110 are spaced from each other. The two first connecting plates 110 are respectively provided with circular holes for the hinge shaft 108 to pass through, and the circular holes on the two first connecting plates 110 are aligned with each other. The seat of the cylinder 105 is provided between two first connecting plates 110. The hinge shaft 108 passes through the seat of the cylinder 105 and the two first connecting plates 110 to hinge the seat of the cylinder 105 to the two first connecting plates 110. One end of a piston rod of the cylinder 105 is hinged to the mounting lug 106.

In this solution, the basic principle of a mounting bracket is as follows. The rollers 103 are provided on the bottom of the mounting base plate 102, and the two slide rails 101 are arranged on the ground foundation 5 for bearing the simulator 118. The mounting base plate 102 is mated with the slide rails 101 through the rollers 103, such that it can move directionally along the length direction of the slide rails 101 to accurately control the translation of the simulator 118. The upper end surface of the mounting base plate 102 is configured to bear the simulator 118, and the weight of the simulator 118 is transferred to the two slide rails 101 through the mounting base plate 102, thus realizing a large bearing capacity. The mounting base plate 102 bearing the simulator 118 is driven by the cylinder 105. The piston end of the cylinder 105 extends or retracts such that the mounting base plate 102 performs reciprocating linear motion on the two slide rails 101. The design realizes smooth operation, easy control, and high thrust and meets the requirement for the translation of the simulator 119.

The upper end surface of the mounting base plate 102 is provided with multiple stop strips 111 in contact with the bottom circumferential outer wall of the simulator 118. Through the stop strips 111, the simulator 118 is fixed on the upper end surface of the mounting base plate 102, thus improving the stability of the simulator 118 on the mounting base plate 102.

The upper end surface of the mounting base plate 102 is provided with two mounting posts 112 along the length direction to fix the manipulators 117 for disassembling and assembling the simulator 118. The two mounting posts 112 are symmetrically arranged, and the length direction of each of the mounting posts 112 is vertical. The mounting posts 112 provide carriers for mounting the manipulators 117, facilitating the integration of the manipulators 117 on the entire translation device and realizing the disassembly and mounting of each section of the simulator 118.

In a specific implementation of the manipulators 117, the simulator 118 is provided with two identical manipulators 117. The two manipulators 117 are arranged at different heights in the same direction and parallel to each other, specifically for controlling the two clips 121 arranged on two sides of the simulator 118.

The clips 121 are part of the simulator 118 and configured to strengthen the connection between the main body and the end cap of the simulator. The manipulators are not integrated with the clips 121. The manipulators are configured to mount the clips 121 on the main body of the simulator 118. The clips 121 can also contribute to sealing the main body. The manipulators have the functions of mounting the clips 121 and centering and supporting the drill pipe bin.

The two clips 121 are semicircular, and the two clips 121 clamp an outer wall of the simulator 118. The inner surface of each of the clips 121 is provided with a clamp groove fitted with the contour of an outer wall of the simulator 118. The back of each of the clips 121 is provided with an arched connection element. The connection element is provided with a drive mechanism for driving the clip 121 to move for clamping. The drive mechanism does not directly contact the clip 121 to avoid deformation of the clip. The drive mechanism is provided on motor mounting plate 129. The motor mounting plates 129 are provided on the mounting posts 112 on two sides of the simulator 118 through mounting bracket 126. The two clips 121 are connected through a mobile stabilizing mechanism.

The solution of the present disclosure is configured to center and fix the simulator 118 of the core bin. During deep in-situ coring simulation, the two clips 121 support and fix an upper end of the core bin to ensure the stability of the position where the drill pipe enters. In addition, during the assembly of the drill pipe and the core bin, the solution ensures the accurate centering of the drill pipe, improves the stiffness of the simulator 118 of the core bin, and ensures the safe and stable assembly of the simulator 118. The servo motor 119 drives screw rod 123 to rotate to drive the two clips 121 to move in opposite directions to fix the core bin. Static guide rod 125 and dynamic guide rod 120 ensure the movement stability and strength of the clips 121, thus ensuring its lateral and longitudinal displacement accuracy.

In this solution, the drive mechanism includes screw rod 123 which is positioned perpendicular to the clips 121. One end of the screw rod 123 is connected to the connection element through a bearing. The screw rod 123 passes through the motor mounting plate 129. The motor mounting plate 129 is provided with a nut threaded to the screw rod 123. The other end of the screw rod 123 is connected to a rotary shaft of a stepping motor. The stepping motor is provided on the motor mounting plate 129. The servo motor 119 rotates to drive the screw rod 123 to move along the nut, moving the clip 121 for clamping. The design realizes the stable movement of the clip and ensures sufficient clamping strength.

In this solution, multiple anti-rotation rods 122 are arranged between second connecting plate 124 and the motor mounting plate 129. In this embodiment, there are three anti-rotation rods 122 evenly distributed around the screw rod 123. The anti-rotation rods 122 are parallel to the screw rod 123, and the anti-rotation rods 122 pass through the motor mounting plate 129. The motor mounting plate 129 is provided with first graphite-bronze sleeves, and the anti-rotation rods 122 are respectively slidably arranged in the first graphite-bronze sleeves. When the screw rod 123 is moved, the anti-rotation rods 122 further ensure the movement stability of the servo motor 119 and achieve the desired sliding effect.

One side of each of the clips 121 is provided with the dynamic guide rod 120. The dynamic guide rod 120 has one end fixedly connected to the clip 121 and the other end passing through and slidably connected to a second graphite-bronze sleeve provided on the motor mounting plate 129. When the clip 121 is moved, the dynamic guide rod 120 moves accordingly to ensure the movement stability of the clip 121.

The mobile stabilizing mechanism includes the static guide rod 125. Two ends of the static guide rod 125 are fixed to the motor mounting plates 129 on two sides of the core bin. The two clips 121 are movably arranged on the static guide rod 125. Two corners of the two clips 121 on the same side are respectively provided with guide sleeves slidably connected to the static guide rod 125. When the two clips 121 move, they are guided by the same static guide rod 125 and move along the same static guide rod 125 to ensure the synchronization of the two clips 121 and reduce errors.

The motor mounting plate 129 and the mounting bracket 126 are movably arranged. The motor mounting plate 129 is provided with vertical strip holes 130. Each of the strip holes 130 is provided therein with a pressing pin. The pressing pin is fixed to the mounting bracket 126. The motor mounting plate 129 is provided with movable lug 131, and the mounting bracket 126 is provided with movable support element 127. The upper end of the movable support element 127 is provided with vertical stud 132. The stud 132 passes through a through hole of the movable lug 131. The upper and lower ends of the stud 132 are provided with adjusting nuts. A spring 128 is provided between each of the adjusting nuts at the upper and lower ends and the movable lug 131. The spring 128 is sleeved on the stud 132. The vertical error of the motor mounting plate 129 can be adjusted through the pressing pin. The springs 128 at the two ends of the stud 132 provide a rebound force, which can effectively resist the vibration caused by high-intensity work. The force of the spring 128 can be adjusted by the adjusting nut.

In a specific implementation of the mounting posts 112, each of the mounting posts 112 is a hollow rectangular post with closure plates 113 at two ends. Each mounting post 112 is provided therein with multiple vertical reinforcing plates 115 and multiple transverse reinforcing plates 114. The multiple transverse reinforcing plates 114 are evenly spaced along a length direction of the mounting post 112. The multiple vertical reinforcing plates 115 are distributed between the multiple transverse reinforcing plates 114, as well as between the transverse reinforcing plates 114 and the closure plates 113. The hollow mounting post 112 reduces the weight and the manufacturing cost. Due to the small weight of the mounting posts 112, the mounting base plate 102 can bear the simulator 118 with a large weight to improve the bearing capacity of the mounting base plate 102.

Pull rod 116 is horizontally provided between the two mounting posts 112. Two ends of the pull rod 116 are detachably connected to the side walls of the two mounting posts 112. The pull rod 116 is provided with multiple mounting holes evenly spaced along the length direction to improve the stability between the two mounting posts 112.

In the core bin assembly subsystem 1 of the present disclosure, the cooperation of the rollers and the slide rails realizes the directional movement of the mounting base plate along the length direction of the slide rails. This movement direction is defined as the Y direction. The two manipulators moving in the Y direction further adjust the position in the Y direction to achieve the overall translation, hoisting, and accurate displacement control of the core bin in the Y direction.

In the present disclosure, steps S4, S5, and S6 are described as follows.

In the present disclosure, the drill pipe bin assembly subsystem 2 includes the mounting bracket and the adaptive drill pipe guide structure. The adaptive drill pipe guide structure is provided on the mounting bracket and is moveable up and down along the mounting bracket to clamp the drill pipe at different heights.

Referring to FIGS. 10 to 14, the mounting bracket includes two symmetrically arranged fixed brackets 201. The bottoms of the two fixed brackets 201 are fixedly connected to the ground foundation, and the two fixed brackets 201 are arranged in a vertical direction.

The bottom of each of the fixed brackets 201 is provided with third connecting plate 217 fixedly connected to the ground foundation. Multiple triangular reinforcing plates 218 are arranged between a side wall of the fixed bracket 201 and the third connecting plate 217. The multiple triangular reinforcing plates 218 improve the connection stability between the fixed bracket 201 and the ground foundation.

Each fixed bracket 201 is provided therein with movable bracket 202 moving in the vertical direction. The top of the movable bracket 202 is provided with drive device 203 and transmission box 204. Transmission screw rods 205 are vertically provided in the movable bracket 202. The transmission screw rods 205 are connected to the drive device 203 through the transmission box 204. Each fixed bracket 201 is fixedly provided with screw nuts 206 threaded to the transmission screw rods 205. Each movable bracket 202 is vertically provided with first guide rods 207. Each fixed bracket 201 is fixedly provided with linear bearings 208 slidably connected to the first guide rods 207.

The basic working principle of the mounting bracket for the assembly method for the deep in-situ high-fidelity coring calibration platform is as follows. The multi-section high-fidelity simulator is placed between the two fixed brackets 201. A mounting plate is provided between the tops of the two movable brackets 202. The mounting plate is provided with a clamping device for clamping the outer wall of the sections of the high-fidelity simulator. The drive device 203 is started and drives the transmission screw rods 205 to rotate through the transmission box 204. The rotating transmission screw rods 205 are threaded into the screw nuts 206 on the fixed bracket 201. In this way, the position of the movable bracket 202 changes with respect to the fixed bracket 201, that is, the position of the clamping device on the top of each of the two movable brackets 202 changes in the vertical direction to control the vertical displacement on the Z-axis. The design realizes the assembly and disassembly of the sections of the high-fidelity simulator, improves the experimental efficiency of the core, and reduces the experimental intensity of the test personnel.

In a specific implementation of the drive device 203 and the transmission box 204, the drive device 203 is a stepping motor. The transmission box 204 is provided with driving shaft 209 with a gear and multiple driven shafts 210 with gears. The driving shaft 109 is connected to an output end of the stepping motor. The driving shaft 209 and the multiple driven shafts 210 are arranged in a straight line in the transmission box 204. Every two adjacent shafts are meshed by their gears for transmission. The transmission screw rods 205 are connected to the driven shafts 210. The drive device 203 transmits the power to the transmission box 204 through a reducer, and the transmission box 204 distributes the power to the driven shafts 210. Thus, the driven shafts 210 drive the transmission screw rods 205 to rotate.

In a specific implementation of the fixed brackets 201 and the mobile brackets, each of the fixed brackets 201 has a rectangular cross-section with notch 211 in a length direction. The fixed bracket 201 can be folded by a profile steel plate. With the structure, the fixed bracket 201 has excellent stress performance and can accommodate the mobile bracket in the notch 211. The mobile bracket can be a closed rectangular structure formed by multiple rectangular steel pipes.

Each movable bracket 202 is mated with two transmission screw rods 205 and two first guide rods 207. The two transmission screw rods 205 are respectively connected to the driven shaft 210 at the two ends of the transmission box 204. The top surface of the fixed bracket 201 is provided with nut mounting plate 212 for mounting and fixing the screw nuts 206. The two screw nuts 206 are respectively located at two ends of the nut mounting plate 212.

The screw nuts 206 each include nut sleeve 214 threaded to the transmission screw rod 205 and connection portion 215 provided on the nut sleeve 214. An orthographic projection of the connection portion 215 is a tangent circle or polygon. The connection portion 215 is provided with multiple mounting holes 216 connected to the nut mounting plate 212. The connection portion 215 facilitates the disassembly and assembly of the screw nut 206 and the nut mounting plate 212.

The two first guide rods 207 are respectively located on two side walls of the movable bracket 202. Two sides of the notch 211 are respectively fixed with bearing mounting plates 213 for fixing the linear bearings 208. The two first guide rods 207 are slidably connected to the two linear bearings 208 respectively.

The two transmission screw rods 205 and the two first guide rods 207 realize the stable and reliable vertical linear movement of the movable bracket 202 in the fixed bracket 201, thus realizing the automation, high-precision assembly, and connection of the high-fidelity simulator, and ensuring safety and stability.

Multiple rectangular reinforcing plates 219 are fixedly arranged on two sides of the notch 211 of each fixed bracket 201. The multiple rectangular reinforcing plates 219 are evenly spaced along the length direction of the fixed bracket 201 to enhance the structural stability of the fixed bracket 201 and avoid excessive deformation when hoisting the sections of the high-fidelity simulator.

The fixed bracket 201 is provided therein with two stop elements 220 in contact with the bottoms of the two transmission screw rods 205. The two stop elements 220 are horizontally arranged and distributed on two outer sides of the notch 211 to limit the stroke of the movable bracket 202 to descend. The design can avoid contact between the bottom of the movable bracket 202 and the ground foundation and can prevent the movable bracket 202 from rapidly falling to the ground foundation due to the failure of the transmission screw rods 205, thus providing a measure to prevent the damage to the movable bracket 202.

In the present disclosure, a first embodiment of step S6 "the adaptive drill pipe guide structure is driven to perform accurate positioning for assembly of the drill pipe bin in the X-axis and perform adaptive guidance for assembly of the drill pipe" is specifically described as follows.

Figure 15:
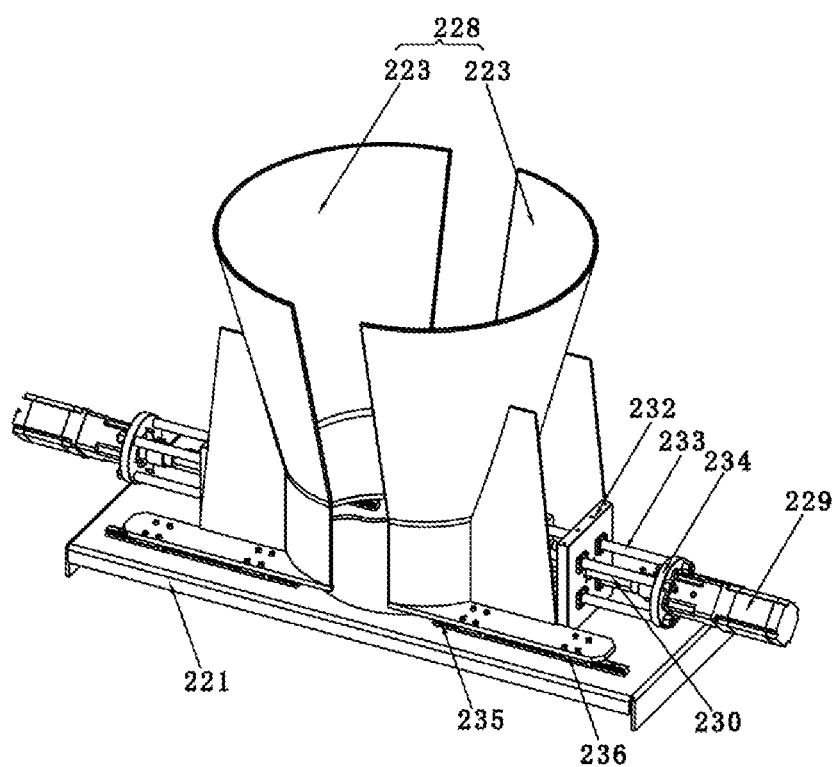
FIG. 15 is a structural diagram of an adaptive drill pipe guide structure.
Figure 16:
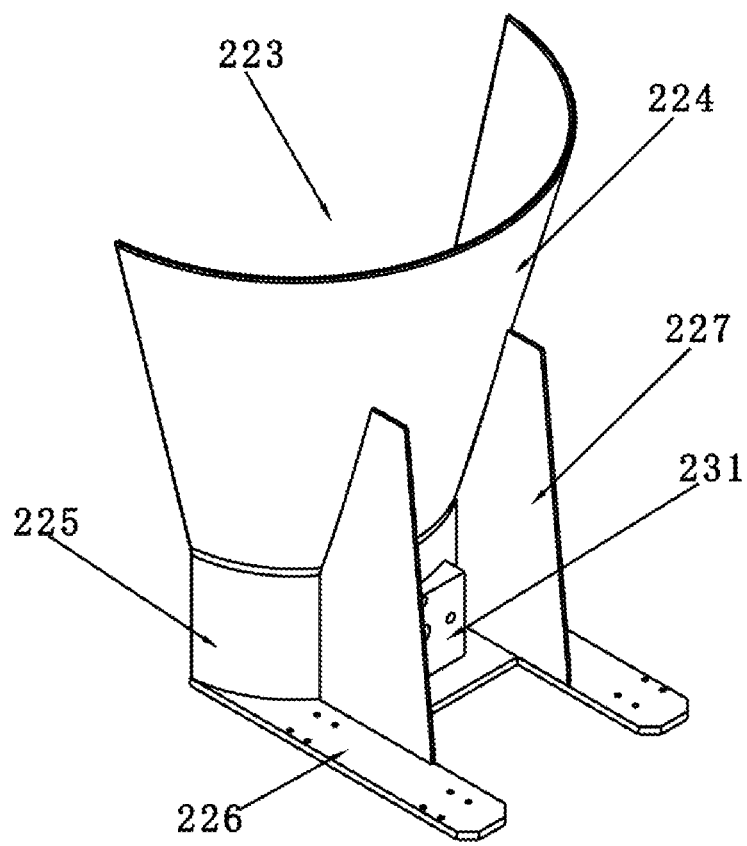
FIG. 16 is a three-dimensional structural diagram of a guide element.
Figure 17:
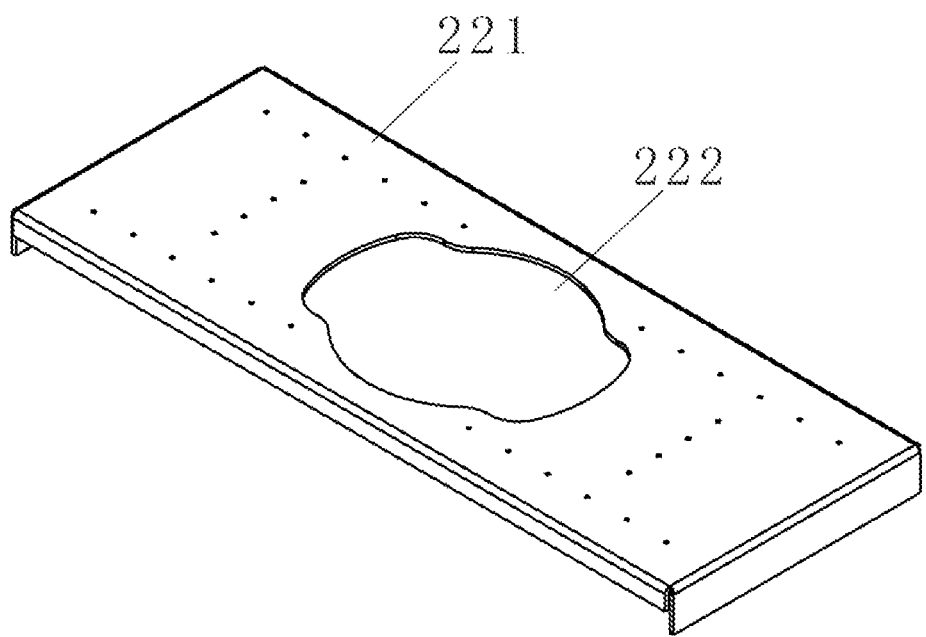
FIG. 17 is a structural diagram of a guide rail mounting plate.

Referring to FIGS. 15 to 17, the adaptive drill pipe guide structure includes guide rail mounting plate 221. The guide rail mounting plate 221 is fixedly provided between the two movable brackets 202 and is movable up and down with the movement of the movable brackets 202.

A central part of the guide rail mounting plate 221 is provided with through hole 222 for the drill pipe to pass through. Two sides of the through hole 222 are symmetrically provided with a pair of guide elements 223 movable close to or away from each other. When the two guide elements 223 move close to each other until their end surfaces contact with each other, they form a funnel-shaped guide sleeve 228 with a large upper part and a small lower part. An inner wall of a small-diameter end of the guide sleeve 228 is configured to contact an outer wall of the drill pipe.

The guide sleeve 228 is located along the X-axis and perpendicular to the Y-axis of the core bin assembly subsystem 1.

Before assembly, the two guide elements 223 move close to each other until they contact to form the funnel-shaped guide sleeve 228. The drill pipe is inserted from the center of the guide sleeve 228. The inner wall of the small-diameter end of the guide sleeve 228 is fitted with the circumferential outer wall of the drill pipe, and the drill pipe is evenly supported and fixed. The design can improve the assembly precision and safety in the assembly process.

In a preferred implementation of the through hole 222, the diameter of the through hole 222 is larger than the inner diameter of the small-diameter end of the guide sleeve 228. The through hole 222 is provided with arc notches on two horizontal sides to prevent the drill pipe from contacting the inner wall of the through hole 222 when it passes through the guide sleeve 228 and through hole 222, thus avoiding scratches on the outer wall of the drill pipe. The arc notches of the through hole 222 expand the area of the through hole 222, which is easy for the drill pipe to pass through and reduces the difficulty of drill pipe assembly.

In a specific implementation of the two guide elements 223, each of the guide elements 223 includes upper part 224 with a hollow semi-conical structure and lower part 225 with a hollow semi-cylindrical structure. The diameter of the lower part 225 is equal to the diameter of the small-diameter end of the upper part 224, and an upper end surface of the lower part 225 is connected to a lower end surface of the upper part 224.

Fourth connecting plate 226 is horizontally provided on the bottom outer wall of the lower part 225. Two reinforcing plates 227 are spaced from each other and arranged between the upper part 224 as well as the lower part 225 and the fourth connecting plate 226. An end surface of each of the reinforcing plates 227 is fixedly connected to an outer wall of the upper part 224, an outer wall of the lower part 225 and an upper end surface of the fourth connecting plate 226. The reinforcing plates 227 improve the overall structural strength of the guide element 223, avoid collision deformation, ensure stable operation, and extend the service life. The fourth connecting plate 226 eases the configuration of a sliding device below to reduce the motion resistance of the guide elements 223 and makes the guide elements 223 stable to move close to or away from each other.

In a specific implementation of the horizontal movement of the guide element 223 along the length direction of the guide rail mounting plate 221, two ends of the guide rail mounting plate 221 are respectively provided with drive devices for driving the horizontal movement of the guide element 223. Each drive device includes rotating motor 229. An output end of the rotating motor 229 is provided with guide screw rod 230. The guide screw rod 230 is positioned between the two reinforcing plates 227. A circumferential outer wall of the lower part 225 is provided with a connection seat 231. A guide rod seat 232 with a bottom fixed to an upper end surface of the guide rail mounting plate 221 is provided between the rotating motor 229 and the connection seat 231. Multiple second guide rods 233 pass through the guide rod seat 232. The multiple second guide rods 233 are slidably connected to the guide rod seat 232. The rotating motor 229 is provided with guide rod motor seat 234. Each second guide rod 233 has one end fixedly connected to the guide rod motor seat 234 and the other end passing through and slidably connected to the connection seat 231. A free end of the guide screw rod 230 passes through the guide rod seat 232 and is threaded to the connection seat 231. The second guide rods 233 prevent deflection. Before the drill pipe is assembled, the two guide elements 223 are separated. When the guide elements 223 need to be assembled, the rotating motor 229 rotates forward to drive the guide screw rod 230 to rotate. The guide screw rod 230 is threaded into the connection seat 231, and the guide screw rod 230 and the connection seat 231 convert the rotary motion of the rotating motor 229 into linear motion and transmit it to the guide element 223. In this way, the two guide elements 223 move close to each other. The rotating motor 229 stops when the two guide elements 223 contact each other. The two guide elements 223 form a funnel-shaped guide sleeve 228 with a large upper part and a small lower part. The guide sleeve 228 guides the drill pipe to ensure that the drill pipe is accurately aligned with the core bin below the mounting platform during assembly. After the drill pipe is assembled, the rotating motor 229 reverses, and the two guide elements 223 are separated.

In a specific implementation of the multiple second guide rods 233, there are four second guide rods 233. The four second guide rods 233 are evenly distributed in two rows and two columns. The guide screw rod 230 is provided at the center of the four second guide rods 233.

Each guide element 223 is mated with a sliding device, and each sliding device includes two linear guide rails 235. The length direction of the two linear guide rails 235 is the same as the length direction of the guide rail mounting plate 221, and the two linear guide rails are fixedly connected to the upper end surface of the guide rail mounting plate 221. The two linear guide rails 235 are located below the fourth connecting plate 226 and distributed on two sides of the fourth connecting plate 226 in a width direction.

A lower surface of the fourth connecting plate 226 is provided with sliders 236 in sliding fit with the two linear guide rails 235. The sliding device reduces the motion resistance of the guide elements 223 and makes the guide elements 223 stable to move close to or away from each other.

In the present disclosure, a first embodiment of step S6 "the adaptive drill pipe guide structure is driven to perform accurate positioning for assembly of the drill pipe bin in the X-axis and perform adaptive guidance for assembly of the drill pipe" is specifically described as follows.

Figure 18:
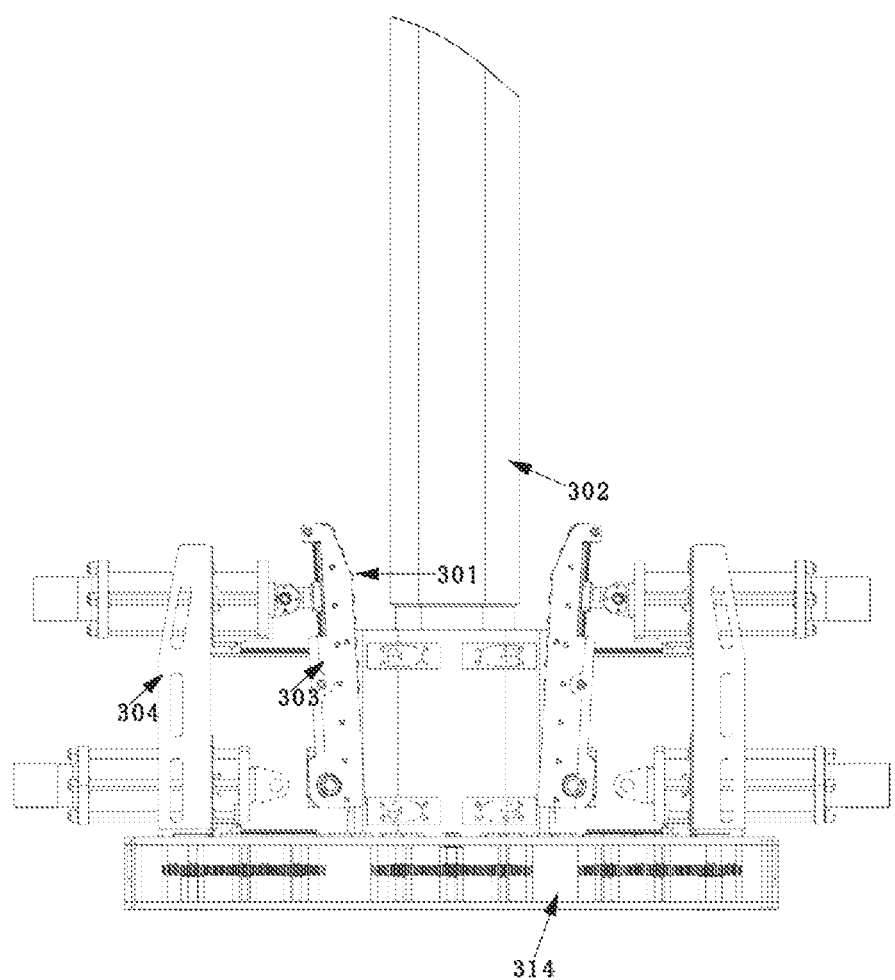
FIG. 18 is a mounting diagram of a sliding adaptive device for guiding and fixing a drill pipe.
Figure 19:
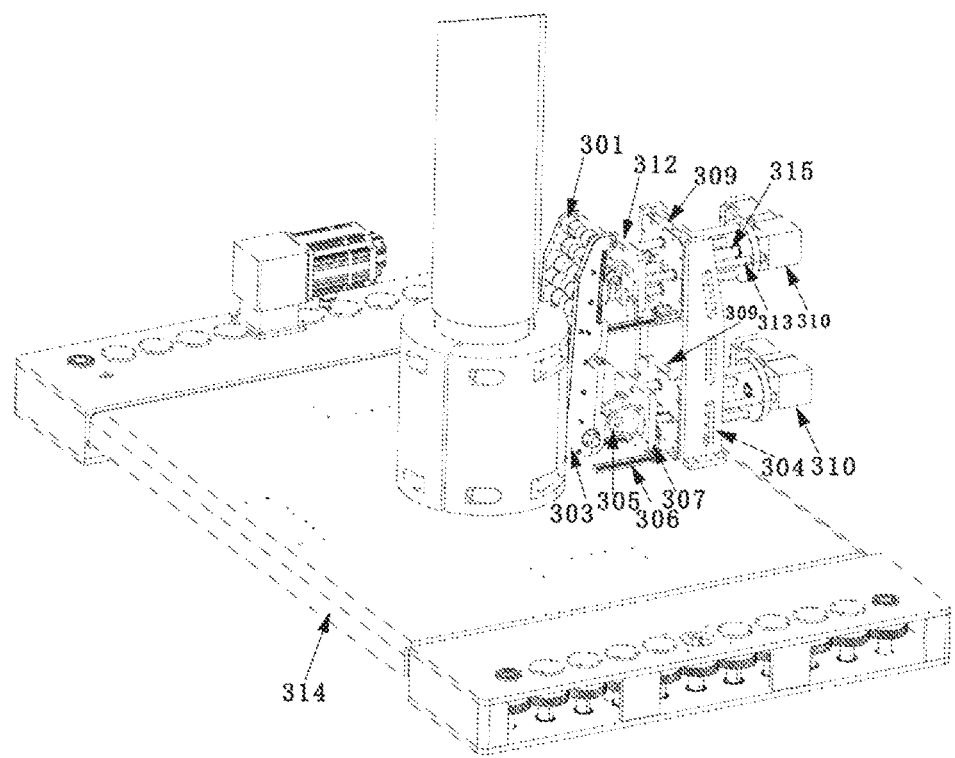
FIG. 19 is a schematic diagram of the sliding adaptive device in contact with the drill pipe.
Figure 20:
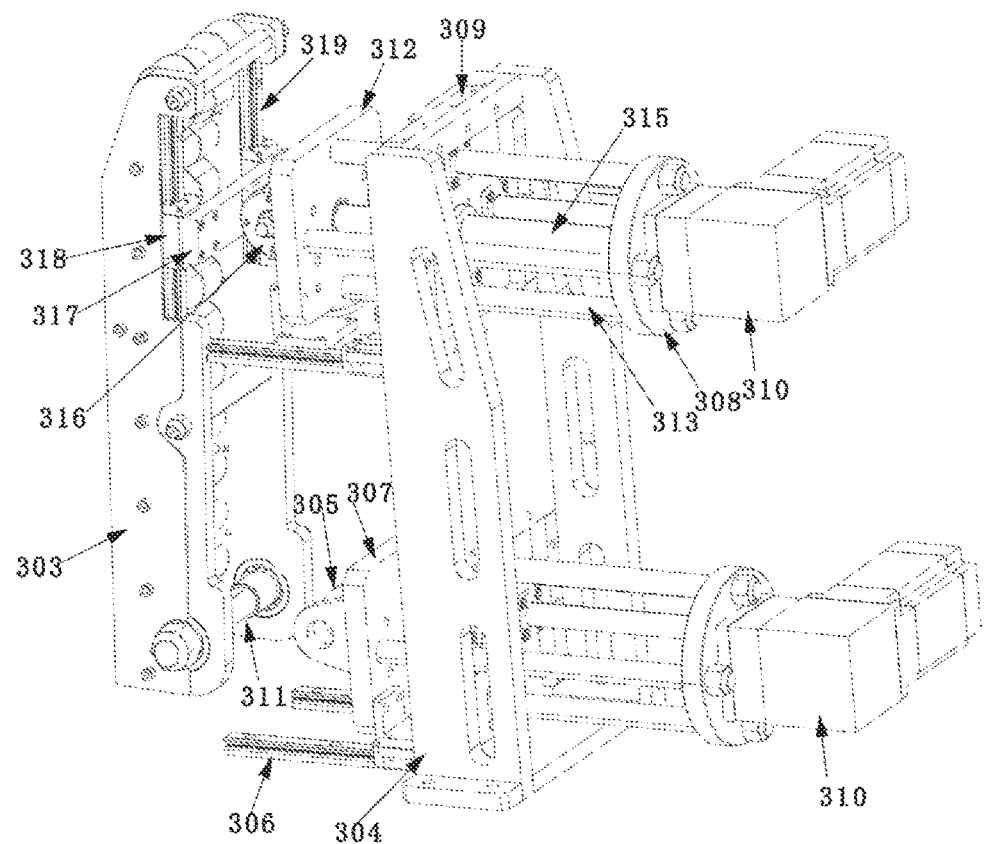
FIG. 20 is a structural diagram of the sliding adaptive device for guiding and fixing the drill pipe.

Referring to FIGS. 18 to 20, the adaptive drill pipe guide structure includes the mounting platform 314. The mounting platform 314 is fixed between the two movable brackets 202 and is movable up and down with the movement of the movable brackets 202.

The mounting platform 314 is provided with a through hole for the drill pipe 302 to pass through, and multiple rolling and sliding support mechanisms are arranged around the through hole. The rolling and sliding support mechanisms each include a support seat. The support seat is provided with a contact element telescopic and swingable on the support seat. A telescopic drive mechanism is provided between the contact element and the support seat. The contact elements on the multiple rolling and sliding support mechanisms form a funnel-shaped structure with a large upper part and a small lower part around the through hole.

In an implementation of this solution, the contact element includes two parallel and vertically arranged sliding mounting plates 303. Multiple rolling shafts 301 are evenly arranged between the two sliding mounting plates 303. The multiple rolling shafts 301 are vertically arranged, and two ends of each of the rolling shafts 301 are rotationally arranged between the two sliding mounting plates 303. The two sliding mounting plates 303 are arranged on the telescopic drive mechanism. The telescopic drive mechanism is movably provided on mounting bracket 304 which is provided at the upper end of the support seat.

An upper end of each of the two sliding mounting plates 303 is provided with a bent part bent away from the drill pipe 302, and multiple rolling shafts 301 are further arranged in the bent part. When the multiple contact elements form the funnel-shaped structure around the through hole, the bent parts form an outwardly protruding edge at the upper end of the funnel-shaped structure to facilitate the insertion of the drill pipe 302 and other parts to avoid damage to the drill pipe 302.

This solution is used on a deep in-situ experimental simulation platform for accurate positioning of an assembly process of a drill pipe bin. It ensures the assembly accuracy of the drill pipe bin and provides stable support and fixation for the drill pipe 302. In addition, during the assembly of the drill pipe 302, this solution guides the drill pipe 302 to ensure that the drill pipe 302 is accurately aligned with the drill pipe 302 bin below the mounting platform 314. Before assembly, the angles and spacing of the multiple contact elements are adjusted to form the funnel-shaped structure. The drill pipe 302 is inserted from the center of the funnel-shaped structure formed by the multiple contact elements. As the drill pipe 302 is inserted, the rolling shafts 301 on the contact elements roll to avoid damaging the drill pipe 302, and they fit perfectly with the surface of the drill pipe 302 to ensure an even support and fixation force.

In the implementation of this solution, an annular groove mated with an outer circumference of the drill pipe 302 is provided in the center of each of the rolling shafts 301. The annular groove has a concave arc-shaped surface and is in smooth fit with the surface of the rolling shaft 301. This design facilitates the contact between the rolling shaft 301 and the drill pipe 302 and prevents the annular groove from damaging the surface of the drill pipe 302.

In the implementation of this solution, the telescopic drive mechanism includes an upper drive mechanism and a lower drive mechanism. The upper drive mechanism includes upper guide-rod fixing plate 312. The upper guide-rod fixing plate 312 is hinged to the upper ends of the two sliding mounting plates 303. The upper guide-rod fixing plate 312 is provided with a movement drive mechanism for driving the upper guide-rod fixing plate 312 to move toward the drill pipe 302. The lower drive mechanism includes lower guide-rod fixing plate 307. The lower guide-rod fixing plate 307 is hinged to the lower ends of the two sliding mounting plates 303. The lower guide-rod fixing plate 307 is provided with a movement drive mechanism for driving the lower guide-rod fixing plate 307 to move toward the drill pipe 302. The movement drive mechanisms are provided on the mounting bracket 304.

The upper ends of the two sliding mounting plates 303 are connected by a locking bolt, and the lower ends of the two sliding mounting plates 303 are connected by a rotating shaft 311. Two ends of the rotating shaft 311 are provided on the sliding mounting plate 303 through bearings. The rotating shaft 311 is provided with a first hinge element hinged to a first hinge seat 305 on the lower guide-rod fixing plate 307. The upper ends of the two sliding mounting plates 303 are respectively provided with two vertical first slide rails 319. The two first slide rails 319 are respectively provided with two first sliders 318. The two first sliders 318 are connected through connecting element 317. The connecting element 317 is provided with a second hinge element hinged to a second hinge seat 316 on the upper guide-rod fixing plate 312.

When the angle of the contact element is adjusted, the upper and lower ends of the contact element can be adjusted synchronously with a high degree of freedom, a stable support force, and a stable structure. The first slide rails 319 are respectively provided in U-shaped grooves of the two sliding mounting plates 303 to facilitate stable vertical positioning and mounting of the first slide rails 319.

The movement drive mechanisms each include sliding guide screw rod 315. The sliding guide screw rod 315 of the movement drive mechanism has one end provided on the upper guide-rod fixing plate 312 through a bearing, and the sliding guide screw rod 315 of the movement drive mechanism has one end provided on the lower guide-rod fixing plate 307 through a bearing. Each sliding guide screw rod 315 has the other end provided with motor seat 308 through a bearing and connected in a transmission manner to motor 310 on the motor seat 308. Each sliding guide screw rod 315 is provided with a screw nut provided on nut mounting plate 309 on the mounting bracket 304, and each sliding guide screw rod 315 passes through the nut mounting plate 309. The motor 310 rotates to drive the sliding guide screw rod 315 to drive the upper and lower ends of the contact element to swing at different angles. The sliding guide screw rod 315 is stably mated with the screw nut.

Multiple stabilizing guide rods 313 are arranged between the upper guide-rod fixing plate 312 and the motor seat 308 of the movement drive mechanism, as well as between the lower guide-rod fixing plate 307 and the motor seat 308 of the movement drive mechanism. The multiple stabilizing guide rods 313 are evenly distributed around the sliding guide screw rod 315. The stabilizing guide rods 313 pass through the nut mounting plate 309 and are slidably connected to the nut mounting plate 309. The stabilizing guide rods 313 further increase the movement stability of the sliding guide screw rod 315 and reduces the error caused by vibration. A lower end of the nut mounting plate 309 is provided with a second slider. The second slider is slidably provided on second slide rail 306 on the mounting platform 314. This design further ensures the movement stability of the upper guide-rod fixing plate 312 and the lower guide-rod fixing plate 307.

In the present disclosure, a first embodiment of step S6 "the adaptive drill pipe guide structure is driven to perform accurate positioning for assembly of the drill pipe bin in the X-axis and perform adaptive guidance for assembly of the drill pipe" is specifically described as follows.

Figure 21:
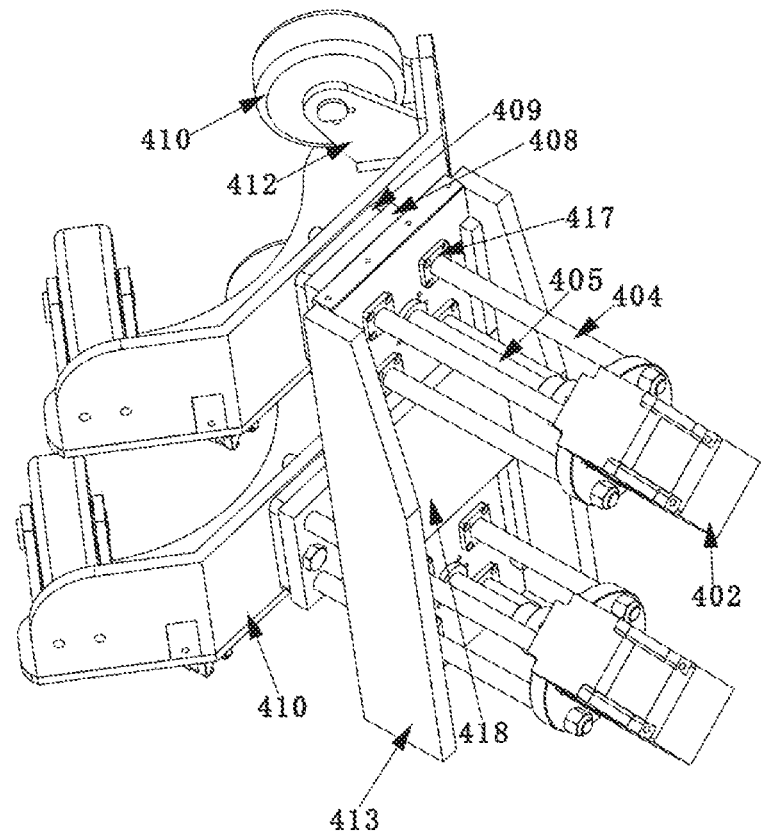
FIG. 21 is a structural diagram of a rolling adaptive device for guiding and fixing the drill pipe.
Figure 22:
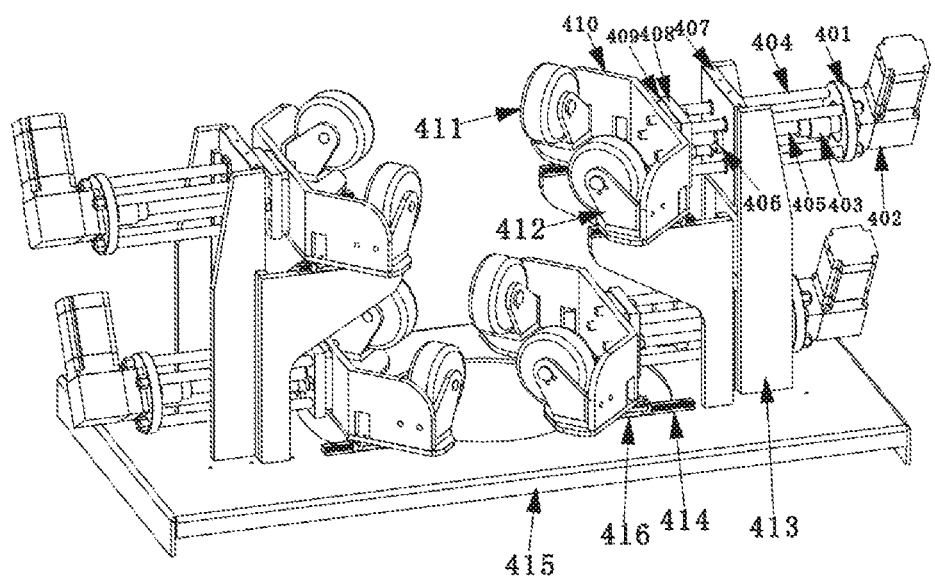
FIG. 22 is a structural diagram of a second roller fixing group.

Referring to FIGS. 21 to 22, the adaptive drill pipe guide structure includes mounting base 415 fixed between two movable brackets 202 and movable up and down with the movement of the movable brackets 202.

The mounting base 415 is provided with a through hole for the drill pipe to pass through. Two sides of the through hole are respectively provided with a first roller fixing group and a second roller fixing group. The first roller fixing group and the second roller fixing group each include a first roller group and a second roller group. The second roller group is provided above the first roller group. The first roller group and the second roller group each include a roller mounting frame. The roller mounting frame is provided with two rollers, and the two rollers are configured in a splayed shape. The circumference of each roller is in contact with the surface of the drill pipe, and each roller is perpendicular to the surface of the drill pipe. A tail of the roller mounting frame is provided with a drive mechanism for driving the roller mounting frame to move in a direction perpendicular to the drill pipe.

This solution is used on a deep in-situ experimental simulation platform for accurate positioning of an assembly process of a drill pipe bin. It ensures the assembly accuracy of the drill pipe bin and provides stable support and fixation for the drill pipe. In addition, during the assembly of the drill pipe, it guides the drill pipe to ensure that the drill pipe is accurately aligned with the drill pipe bin below the mounting platform. Before assembly, the angles and spacing of the multiple contact elements are adjusted. The multiple rollers enclose and clamp the drill pipe. The drill pipe is inserted from the center of the multiple rollers. As the drill pipe is inserted, the rollers roll to avoid damaging the drill pipe, and they fit perfectly with the surface of the drill pipe to ensure an even support and fixation force.

In this solution, the roller mounting frame includes a C-shaped mounting plate 410. A lower end of the mounting plate is provided with a support plate. The support plate is provided with a C-shaped notch surrounding the drill pipe. The two rollers on the roller mounting frame are arranged on the support plate and distributed on two sides of the C-shaped notch. The drive mechanism is provided on the back of the mounting plate. The mounting plate and the support plate provide support for the rollers. The rollers limit the degrees of freedom of the drill pipe in all directions to ensure even force and high positioning accuracy.

In this solution, the drive mechanism includes guide screw rod 405. The back of the mounting plate is provided with fixing plate 408. The guide screw rod 405 has one end provided on the fixing plate 408 through a bearing and the other end connected to a rotating shaft of servo motor 402 through coupling 403. A central section of the guide screw rod 405 is provided in guide seat 407. The guide seat 407 is fixed on the mounting base 415 through the support seat. The guide seat 407 is provided with nut 406 connected to the guide screw rod 405. The servo motor 402 is provided on the motor mounting seat 401. A mobile stabilizing mechanism is provided between motor mounting seat 401 and the fixing plate 408. The mobile stabilizing mechanism is slidably connected to the guide seat 407.

In this solution, the mobile stabilizing mechanism includes multiple guide rods 404. In this embodiment, there are four guide rods 404, each with two ends respectively fixed to the fixing plate 408 and the motor mounting seat 401. The four guide rods 404 are evenly distributed around the guide screw rod 405, and the guide rods 404 are parallel to the guide screw rod 405. The guide rods 404 are slidably arranged on the guide seat 407 through graphite-bronze sleeves 417.

The servo motor 402 drives the guide screw rod 405 to rotate, thus driving the mounting plate to move left and right. In this way, the first roller group and the second roller group are opened and closed to position and support the drill pipe. The guide rods 404 ensure the movement stability of the guide screw rod 405 and the support stability of the rollers. Each first roller group and second roller group can be adjusted freely.

In this solution, the support seat includes two parallel vertical plates 413. Central parts of the two vertical plates 413 are connected through connecting plate 418. The upper and lower ends of the connecting plate 418 are provided with clamping openings for mounting the guide seat 407. The design realizes the stable mounting and fixation of the guide seat 407. In addition, rubber cushion 409 is provided between the mounting plate and the fixing plate 408 to effectively relieve the vibration from the drill pipe.

In this solution, two parallel slide rails 414 are arranged below the support plate. The slide rails 414 are parallel to the guide screw rod 405. A lower end of the support plate is provided with two sliders 416, which are slidably arranged on the slide rails 414. The sliders 416 and the slide rails 414 further improve the movement stability and support stability of the rollers.

Although the specific implementations of the present disclosure are described above in detail in combination with the drawings, they should not be construed as a limitation to the protection scope of the present disclosure. All modifications and variations made by those skilled in the art within the scope defined by the claims without creative efforts should fall within the protection scope of the present disclosure.

What is claimed is:

1. An assembly method for a in-situ coring calibration platform, comprising the following steps:
    S1: fixing a core bin assembly subsystem on a preset ground foundation and fixing a simulator of a core bin on a mounting base plate of the core bin assembly subsystem;
    S2: driving a cylinder, wherein a piston end of the cylinder drives the mounting base plate to move on a Y-axis until a preset position;
    S3: driving a servo motor and controlling, by two manipulators, two clips to move closer to each other along the simulator to support and fix the simulator of the core bin;
    S4: fixing a drill pipe bin assembly subsystem on the ground foundation, wherein the drill pipe bin assembly subsystem is provided on an X-axis perpendicular to the Y-axis;
    S5: assembling multiple sections of a drill pipe bin in turn based on a length of a drill pipe to form a complete drill pipe bin; aligning and connecting, after assembly, a bottom of the complete drill pipe bin to the simulator of the core bin, and aligning and communicating a top of the complete drill pipe bin with a lower part of an adaptive drill pipe guide structure; and
    S6: driving the adaptive drill pipe guide structure to perform positioning for an assembly of the drill pipe bin in the X-axis and perform an adaptive guidance for an assembly of the drill pipe.

2. The assembly method for the in-situ coring calibration platform according to claim 1, wherein step S1: fixing the core bin assembly subsystem on the preset ground foundation and fixing the simulator of the core bin on the mounting base plate of the core bin assembly subsystem specifically comprises:
    providing two slide rails on the ground foundation bearing the simulator, and providing rollers at a bottom of the mounting base plate, wherein the rollers cooperate with the slide rails to realize a directional movement of the mounting base plate along a length direction of the slide rails; and
    symmetrically arranging two mounting posts on two ends of the mounting base plate, and arranging the two manipulators along a vertical direction of the mounting posts.

3. The assembly method for the in-situ coring calibration platform according to claim 1, wherein step S2: driving the cylinder, wherein the piston end of the cylinder drives the mounting base plate to move on the Y-axis until the preset position specifically comprises:
    driving the cylinder, wherein the piston end of the cylinder extends or retracts to enable the mounting base plate to perform a reciprocating linear motion on two slide rails until the simulator reaches the preset position.

4. The assembly method for the in-situ coring calibration platform according to claim 1, wherein step S3: driving the servo motor and controlling, by the two manipulators, the two clips to move closer to each other along the simulator of the core bin to support and fix the simulator specifically comprises:
    driving, by the servo motor, a screw rod to rotate to drive the two clips to move closer to each other to fix the simulator of the core bin;
    arranging three anti-rotation rods between a second connecting plate and a motor mounting plate, wherein the three anti-rotation rods are evenly distributed around and parallel to the screw rod, and pass through the motor mounting plate; the motor mounting plate is provided with first graphite-bronze sleeves, and the anti-rotation rods are slidably arranged in the first graphite-bronze sleeves, respectively; and when the screw rod is moved, the anti-rotation rods ensure a movement stability of the servo motor;
    providing a dynamic guide rod at one side of each clip, wherein the dynamic guide rod has one end fixedly connected to the clip and the other end passing through and slidably connected to a second graphite-bronze sleeve provided on the motor mounting plate; and when the clip is moved, the dynamic guide rod is moved accordingly to ensure a movement stability of the clip; and
    fixing two ends of a static guide rod to motor mounting plates on two sides of the core bin, respectively, movably arranging the two clips on the static guide rod, and respectively providing guide sleeves slidably connected to the static guide rod at two corners of the two clips at a same side, wherein when the two clips are moved, the two clips are guided by and moved along the same static guide rod to ensure a synchronization of the two clips.

5. The assembly method for the in-situ coring calibration platform according to claim 4, wherein the motor mounting plate and a mounting bracket are movably arranged; the motor mounting plate is provided with vertical strip holes, each of the vertical strip holes is provided therein with a pressing pin; the pressing pin is fixed to the mounting bracket; the motor mounting plate is provided with a movable lug, and the mounting bracket is provided with a movable support element; an upper end of the movable support element is provided with a vertical stud, and the stud passes through a through hole of the movable lug; upper and lower ends of the stud are respectively provided with adjusting nuts; a spring is provided between each of the adjusting nuts at the upper and lower ends of the stud and the movable lug; the spring is sleeved on the stud; a vertical error of the motor mounting plate is adjusted through the pressing pin; the springs at the upper and lower ends of the stud provide a rebound force for resisting a vibration; and the rebound force of each spring is adjusted by the adjusting nut.

6. The assembly method for the in-situ coring calibration platform according to claim 1, wherein step S4: fixing the drill pipe bin assembly subsystem provided on the X-axis perpendicular to the Y-axis on the ground foundation specifically comprises:

mounting two fixed brackets, arranged symmetrically and provided on the X-axis, on the ground foundation, wherein each of the two-fixed brackets is provided therein with a movable bracket moving in a vertical direction; a top of the movable bracket is provided with a drive device and a transmission box; transmission screw rods are vertically provided in the movable bracket and are connected to the drive device through the transmission box; each of the fixed brackets is fixedly provided with screw nuts threaded to the transmission screw rods; each movable bracket is vertically provided with guide rods; and each of the fixed brackets is fixedly provided with linear bearings slidably connected to the guide rods; and placing a multi-section simulator between the two fixed brackets, wherein a mounting plate provided between tops of the two movable brackets is provided with a clamping device for clamping an outer wall of a section of the high-fidelity simulator; and controlling and starting the drive device to drive the transmission screw rods to rotate through the transmission box, wherein the rotating transmission screw rods threaded to the screw nuts on the fixed bracket cause a change in a position of the movable bracket with respect to the fixed bracket, and cause a change in a position of the clamping device on the top of each of the two movable brackets in the vertical direction;

wherein the drive device is a stepping motor; the stepping motor transmits a power to the transmission box through a reducer, and the transmission box distributes the power to driven shafts, such that the driven shafts drive the transmission screw rods to rotate.

7. The assembly method for the in-situ coring calibration platform according to claim 1, wherein step S6: driving the adaptive drill pipe guide structure to perform the positioning for the assembly of the drill pipe bin in the X-axis and perform the adaptive guidance for the assembly of the drill pipe specifically comprises:

providing the adaptive drill pipe guide structure, wherein the adaptive drill pipe guide structure comprises a guide rail mounting plate, and a central part of the guide rail mounting plate is provided with a through hole for the drill pipe to pass through; two sides of the through hole are symmetrically provided with a pair of guide elements movable closer to or away from each other; when the two guide elements move closer to each other to have end surfaces contact with each other, the two guide elements form a funnel-shaped guide sleeve with an upper part and a lower part smaller in diameter than the upper part; and an inner wall of a lower end of the guide sleeve is configured to contact an outer wall of the drill pipe; and assembling the two guide elements, wherein the two guide elements are separated before the assembly of the drill pipe; rotating a rotating motor forward to drive a guide screw rod to rotate, wherein the guide screw rod is threaded to a connection seat; converting, by the guide screw rod and the connection seat, a rotary motion of the rotating motor into a linear motion, and transmitting the linear motion to the guide element, such that the two guide elements move closer to each other; and stopping the rotating motor when the two guide elements contact with each other, such that the two guide elements form the funnel-shaped guide sleeve with the large upper part and the lower part, wherein the guide sleeve is configured for guiding the drill pipe.

8. The assembly method for the in-situ coring calibration platform according to claim 1, wherein step S6: driving the adaptive drill pipe guide structure to perform the positioning for the assembly of the drill pipe bin in the X-axis and perform the adaptive guidance for the assembly of the drill pipe specifically comprises:

providing the adaptive drill pipe guide structure, wherein a mounting platform is provided with a through hole for the drill pipe to pass through, and multiple rolling and sliding support mechanisms are arranged around the through hole; the rolling and sliding support mechanisms each comprise a support seat; the support seat is provided with a contact element telescopic and swingable on the support seat; a telescopic drive mechanism is provided between the contact element and the support seat; and the contact elements on the multiple rolling and sliding support mechanisms form a funnel-shaped structure with an upper part and a lower part smaller in diameter than the upper part around the through hole;

the contact element comprises two parallel sliding mounting plates, wherein the sliding mounting plates are vertically arranged; multiple rolling shafts are evenly arranged between the two sliding mounting plates; the multiple rolling shafts are vertically arranged, and two ends of each of the rolling shafts are rotationally arranged between the two sliding mounting plates; the two sliding mounting plates are arranged on the telescopic drive mechanism; and the telescopic drive mechanism is movably provided on a mounting bracket provided at an upper end of the support seat; and adjusting angles and spacing of the multiple contact elements before assembly to form the funnel-shaped structure; inserting the drill pipe from a center of the multiple contact elements; and rolling, when the drill pipe is inserted, the rolling shafts on the contact elements to avoid damaging the drill pipe, and fitting the rolling shafts with a surface of the drill pipe to ensure an even support and fixation force.

9. The assembly method for the in-situ coring calibration platform according to claim 8, wherein the telescopic drive mechanism comprises an upper drive mechanism and a lower drive mechanism; the upper drive mechanism comprises an upper guide-rod fixing plate, wherein the upper guide-rod fixing plate is hinged to upper ends of the two sliding mounting plates; the upper guide-rod fixing plate is provided with a movement drive mechanism for driving the upper guide-rod fixing plate to move towards the drill pipe; the lower drive mechanism comprises a lower guide-rod fixing plate, wherein the lower guide-rod fixing plate is hinged to lower ends of the two sliding mounting plates; the lower guide-rod fixing plate is provided with a movement drive mechanism for driving the lower guide-rod fixing plate to move towards the drill pipe; and the movement drive mechanisms are provided on the mounting bracket;

when the angle of the contact element is adjusted, upper and lower ends of the contact element are adjusted synchronously; and first slide rails are respectively provided in U-shaped grooves of the two parallel sliding mounting plates to achieve a vertical positioning of the first slide rails; and a motor rotates to drive a sliding guide screw rod to drive the upper and lower ends of the contact element to swing at different angles; and the sliding guide screw rod is mated with a screw nut.

10. The assembly method for the in-situ coring calibration platform according to claim 1, wherein step S6: driving the adaptive drill pipe guide structure to perform the positioning for the assembly of the drill pipe bin in the X-axis and perform the adaptive guidance for the assembly of the drill pipe specifically comprises:

providing an adaptive guide and fixation device, wherein the adaptive guide and fixation device comprises a mounting base, the mounting base is provided with a through hole for the drill pipe to pass through; two sides of the through hole are respectively provided with a first roller fixing group and a second roller fixing group; the first roller fixing group and the second roller fixing group each comprise a first roller group and a second roller group; the second roller group is provided above the first roller group; the first roller group and the second roller group each comprise a roller mounting frame; the roller mounting frame is provided with two rollers, and the two rollers are configured in a splayed shape; a circumference of each roller is in contact with a surface of the drill pipe, and each roller is perpendicular to the surface of the drill pipe; and a tail of the roller mounting frame is provided with a drive mechanism for driving the roller mounting frame to move in a direction perpendicular to the drill pipe; and adjusting angles and spacing of multiple contact elements before assembly, such that the multiple rollers enclose and clamp the drill pipe; inserting the drill pipe from a center of the multiple rollers; and rolling, when the drill pipe is inserted, the rollers to avoid damaging the drill pipe, and fitting the rollers with the surface of the drill pipe to ensure an even support and fixation force;

wherein, the roller mounting frame comprises a C-shaped mounting plate; a lower end of the mounting plate is provided with a support plate; the support plate is provided with a C-shaped notch surrounding the drill pipe; the two rollers, by the mounting frame, are arranged on the support plate and distributed on two sides of the C-shaped notch; the drive mechanism is provided on a back of the mounting plate; the mounting plate and the support plate provide a support for the rollers; and the rollers limit degrees of freedom of the drill pipe in all directions;

a servo motor drives a guide screw rod to rotate to drive the mounting plate to move left and right, such that the first roller group and the second roller group are opened and closed to position and support the drill pipe; and the support seat comprises two parallel vertical plates; central parts of the two vertical plates are connected through a connecting plate; and upper and lower ends of the connecting plate are provided with clamping openings for mounting a guide seat to realize a mounting and fixation of the guide seat.

\* \* \* \* \*